(Model.)
H. A. MUELLER.
Carpet Sweeper.
No. 238,144. Patented Feb. 22, 1881.
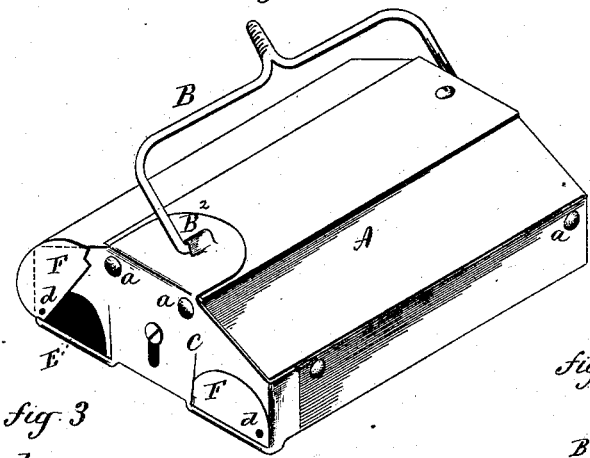
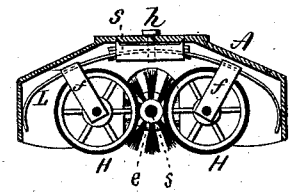
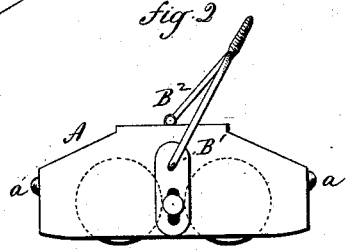
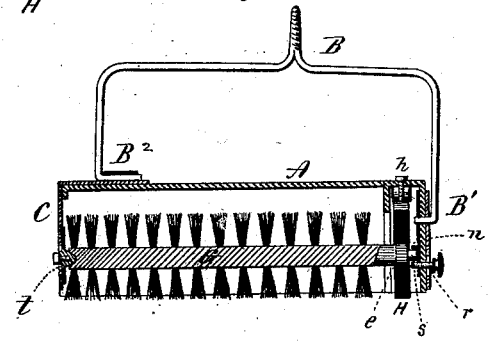
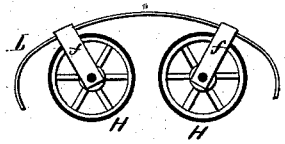
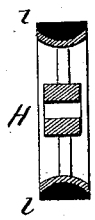
Witnesses,
Henry A. Mueller
Inventor
By atty.
N. PETERS, PHOTO LITHOGRAPHER, WASHINGTON, D. C.

UNITED STATES PATENT OFFICE.

HENRY A. MUELLER, OF NEW HAVEN, CONNECTICUT, ASSIGNOR TO MARIA WIEDERSUM, OF NEW YORK, N. Y.

CARPET-SWEEPER.

SPECIFICATION forming part of Letters Patent No. 238,144, dated February 22, 1881.

Application filed January 3, 1881. (Model.)

*To all whom it may concern:*

Be it known that I, HENRY A. MUELLER, of New Haven, in the county of New Haven and State of Connecticut, have invented a new Improvement in Carpet-Sweepers; and I do hereby declare the following, when taken in connection with the accompanying drawings and the letters of reference marked thereon, to be a full, clear, and exact description of the same, and which said drawings constitute part of this specification, and represent, in—

Figure 1, a perspective view; Fig. 2, end view; Fig. 3, section through the driving-gear; Fig. 4, longitudinal section; Figs. 5, 6, 7, and 8, detached views.

This invention relates to an improvement in that class of carpet-sweepers in which a rotary brush is driven by means of wheels rolling on the carpet; and the invention consists in the details of construction, as hereinafter described, and particularly recited in the claims.

The general outline of the box or case A does not differ materially from that of other sweepers.

B is the bail, to which the handle is attached. This has usually been hinged to the box, either on each end below the top or entirely upon the top. When hinged at the end below the top it applies the power nearer to the floor, and hence is not as liable to tip the box as when applied to the top above; but when applied at the ends the bail prevents the sweeper from being run as close to the wall as desirable. Hence the bail is often attached directly to the top of the box; but when so attached it is so far above the floor that it is difficult to hold the sweeper upon the floor or prevent it from tipping. To overcome these difficulties I hinge one end, B', of the bail to the end of the box below the top, the other end, B², directly to the top, distant from one end, as shown in the drawings. This applies the moving force to the sweeper below the top, as at B', and also to the top, so as to leave one end free to run close to the wall; hence gives to the sweeper the advantages of the two arrangements of the bail.

To prevent injury to the wall or furniture by the sweeper rubbing against it, I apply elastic or flexible cushions $a$ at different points. These cushions or guards are best made in the shape of small india-rubber hemispheres, attached directly to the case, and so as to project therefrom, as seen in Fig. 2, the projection being sufficient to prevent the box striking against the wall, and the material such that it will not deface whatever it may strike.

In order to bring the brush as near the wall as possible, the wall end C of the box—that is, the end at which the bail is attached on the top—is made of thin sheet metal, lapped upon and firmly secured to the box. The dust-receivers D extend to this metal end C, and instead of opening the top of the box, as is usual in such sweepers, I construct the end C with an opening, E, for each of the dust-receivers, and provide these openings with a cover, F, pivoted, as at $d$, to the end C, so as to turn up from the openings in a plane parallel with the end C, and as seen at the left in Fig. 1. This construction enables the box to be made perfectly tight around its top, and offers no joint through which dust can escape. The covers F being made perfectly tight, and being at the end, it is more convenient to empty those receptacles than from the top, because both are emptied from openings so near together as to be substantially one opening.

G is the brush shaft or body, upon which the bristles are arranged in substantially the usual manner. At one end the shaft is provided with a pulley, $e$, which lies between two wheels, H H. (See Fig. 3.) These wheels are arranged so as to run upon the floor and receive a revolution by the movement of the sweeper. The wheels H are hung to a spring, L, which consists of a strip of elastic metal, extending from side to side of the box and above the wheels, and from which spring hangers $f$ extend down to receive the pivot or axle of the wheels. This spring gives a certain amount of elasticity to the wheels, tending to force them toward each other. It also enables the wheels to be arranged in their hangers independent of the case, as seen in Fig. 6. The spring L is secured to the box by a clip, $u$. (See Figs. 3 and 8.) This clip surrounds the spring, and between it and the spring, and between the spring and the top of the box, an india-rubber cushion, $w$, is arranged, so that the support of the spring comes entirely between the two cushions of india-rubber. These cushions insulate the wheels from the box, and avoid almost entirely the usual rattling noise which accompanies the sweeper. The wheels H are made of cast metal, with an india-rubber face, $l$, (see Fig. 7,) formed upon the metal and vulcanized thereon.

At the wheel or driving end of the box a seat, $n$, is made for the pivot of the brush at that end. This is formed with an expanding mouth, $m$, at the bottom, so that when the pivot of the brush is set within the said mouth it is necessarily guided by the sides of the mouth to its place or bearing $n$. Then, when in place, a set-screw, $r$, is introduced from the outside, beneath the pivot $s$ of the brush, as seen in Fig. 4, which prevents the brush from falling out. At the opposite end a conical-shaped stationary bearing, $t$, is arranged, and that end of the brush-shaft provided with a corresponding seat, and onto which the brush is placed before the opposite end is introduced to the mouth $m$.

As the sweeper is moved in either direction the wheels H necessarily revolve and impart revolutions to the brush to take up and deposit the sweepings in one of the receptacles D D, according to the direction in which the brush is driven.

The bearings of the brush are adjustable, to raise or lower the brush, as may be required.

I claim—

1. In a carpet-sweeper substantially such as described, the handle-bail pivoted to one end of the box below the top, and at the other end pivoted directly to the top upon the outside, away from the end, substantially as described.

2. In a carpet-sweeper in which the brush is driven by wheels within the case rolling upon the floor, the combination of the spring L, clip $u$, india-rubber cushions $w$, hangers $f$, and wheels H H, substantially as described.

3. The combination, in a carpet-sweeper, of the driving-wheels H H, the stationary pivot $t$ at the end of the case opposite the wheels, a bearing, $n$, at the wheel end, constructed with an open mouth, $m$, to receive the pivot of the brush at that end, and a screw, $r$, all substantially as and for the purpose described.

HENRY A. MUELLER.

Witnesses:
JOHN E. EARLE,
L. D. ROGERS.